(12) United States Patent
Cho

(10) Patent No.: US 10,372,230 B2
(45) Date of Patent: Aug. 6, 2019

(54) USER INTERFACE DEVICE USING TRANSMISSION AND RECEPTION OF ULTRASONIC SIGNALS

(71) Applicant: Center for Integrated Smart Sensors Foundation, Daejeon (KR)

(72) Inventor: Kyung Il Cho, Daejeon (KR)

(73) Assignee: Center for Integrated Smart Sensors Foundation, Daejeon (KR)

( * ) Notice: Subject to any disclaimer, the term of this patent is extended or adjusted under 35 U.S.C. 154(b) by 0 days.

(21) Appl. No.: 15/798,241

(22) Filed: Oct. 30, 2017

(65) Prior Publication Data

US 2018/0120946 A1 May 3, 2018

(30) Foreign Application Priority Data

Oct. 31, 2016 (KR) .................. 10-2016-0143140

(51) Int. Cl.
*G06F 3/01* (2006.01)
*G06F 3/0354* (2013.01)
*G06F 3/038* (2013.01)

(52) U.S. Cl.
CPC .............. *G06F 3/017* (2013.01); *G06F 3/038* (2013.01); *G06F 3/0383* (2013.01); *G06F 3/03543* (2013.01)

(58) Field of Classification Search
CPC ........... G06F 3/017; G06F 3/043–0436; G06F 3/03541–03543; G06F 3/041–048; G01B 11/24; H04N 1/00026; G02F 1/292
See application file for complete search history.

(56) References Cited

U.S. PATENT DOCUMENTS

| | | | | |
|---|---|---|---|---|
| 2009/0284469 A1* | 11/2009 | Hsieh | ................... | G06F 1/1626 345/158 |
| 2011/0050477 A1* | 3/2011 | Choi | ................... | G06F 3/0346 341/176 |
| 2013/0255388 A1* | 10/2013 | Takeuchi | ........... | G01N 29/2418 73/655 |
| 2014/0253435 A1* | 9/2014 | Boser | ................... | G06F 3/043 345/156 |
| 2015/0082890 A1* | 3/2015 | Pant | ................... | G01N 29/265 73/618 |
| 2015/0087991 A1* | 3/2015 | Chen | ................... | G01S 7/5202 600/459 |
| 2015/0165479 A1* | 6/2015 | Lasiter | ............... | B06B 1/0666 310/322 |
| 2015/0193197 A1* | 7/2015 | Nahman | ............. | G06F 3/04842 715/716 |

(Continued)

FOREIGN PATENT DOCUMENTS

| | | |
|---|---|---|
| JP | 2007-289693 A | 11/2007 |
| KR | 10-2016-0009291 A | 1/2016 |
| KR | 10-2016-0097410 A | 8/2016 |

*Primary Examiner* — Sanjiv D. Patel
(74) *Attorney, Agent, or Firm* — Christensen O'Connor Johnson Kindness PLLC

(57) ABSTRACT

Disclosed is a user interface device that interacts with a computer or a TV that realizes an electronic device, the user interface device including a motion recognition module configured to recognize a motion of a user by using transmission and reception of an ultrasonic signal; and a battery configured to supply electric power to the motion recognition module.

13 Claims, 6 Drawing Sheets

(56) References Cited

U.S. PATENT DOCUMENTS

| | | | |
|---|---|---|---|
| 2015/0286328 A1* | 10/2015 | Lee | G06F 3/0412 |
| | | | 345/173 |
| 2017/0110504 A1* | 4/2017 | Panchawagh | H01L 27/20 |
| 2017/0115713 A1* | 4/2017 | Shin | G06F 1/266 |
| 2018/0309043 A1* | 10/2018 | Kobrin | H01L 41/081 |

* cited by examiner

USER INTERFACE DEVICE USING TRANSMISSION AND RECEPTION OF ULTRASONIC SIGNALS

BACKGROUND

Embodiments of the inventive concept described herein relate to a user interface device that interacts with a computer or a TV that realizes an electronic device, and more particularly, relate to a technology on a user interface device that recognizes a motion of a user by using transmission and reception of ultrasonic signals.

With the advent of mouse devices that support a function of moving a pointer that designates contents and a location of an execution command in a computer monitor, the computers have been converted to graphic user interface (GUI) systems.

In the GUI systems, a technology of detecting a motion of the user by using an infrared sensor and using the detected motion as a user input has recently been significantly spotlighted.

Accordingly, an integrated user interface technology that not only uses a pointer of a mouse device as a user input but also uses a motion of the user as an input of the user is required.

However, if a user motion detection technology based on an infrared ray is applied to the conventional mouse device, electric power consumed to use infrared ray sensor is much higher than power consumption of the mouse device.

The following embodiments of the inventive concept suggest a motion detection technology of a user, which may be applied in consideration of power consumption of a conventional mouse device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the inventive concept provide a user interface device that recognizes a motion of a user, the user interface device improving power consumption.

In detail, embodiments of the inventive concept provide a user interface device that recognizes a motion of a user by using transmission and reception of ultrasonic signals Embodiments of the inventive concept also provide a user interface device, a mode of which is set to any one of a general user interface mode or a motion recognition mode to selectively perform an operation of recognizing a motion of a user.

In accordance with an aspect of the inventive concept, there is provided a user interface device that interacts with a computer or a TV that realizes an electronic device, the user interface device including a motion recognition module configured to recognize a motion of a user by using transmission and reception of an ultrasonic signal, and a battery configured to supply electric power to the motion recognition module.

The motion recognition module may include a plurality of micro-machined transducers disposed in a 2D array form to allow 3D beam condensation and configured to transmit and receive the ultrasonic signal.

The plurality of micro-machined transducers may be piezoelectric micro-machined transducers of high sensitivity, which are realized by using sol-gel piezoelectric bodies.

An impedance matching unit having an impedance that is lower than those of the plurality of micro-machined transducers may be disposed at an upper end of the motion recognition module.

The impedance matching unit may be formed of a PDMS or a rubber material at an upper end of the motion recognition module or may be formed of a hole at an upper end of the motion recognition module.

The motion recognition module may determines whether the ultrasonic signal reflected by a hand of the user and received is a preset reference value or higher, and may set the user interface device to any one of a general user interface mode or a motion recognition mode based on the determination result.

When the received ultrasonic signal is the preset reference value or lower, the motion recognition module may perform an operation of recognizing a motion of the user by setting the user interface device to the motion recognition mode.

The motion recognition module may transmit the ultrasonic signal to a space in which a hand of the user is located, and may extract a motion of the hand of the user based on the ultrasonic signal reflected by the hand of the user and received.

The motion recognition module may extract the motion of the hand of the user, based on a shape of a widened V surface, of the shape of the hand of the user who uses the user interface device, between an index finger and a middle finger.

The motion recognition module may perform a user interface function corresponding to the extracted motion of the hand of the user.

The motion recognition module may be provided on one side of the user interface device, based on a location of the hand of the user who uses the user interface device.

The motion recognition module may include a pulser/receiver configured to process the ultrasonic signal, a beam former configured to perform beam forming on the ultrasonic signal, and an analog-digital converter configured to convert the ultrasonic signal.

In accordance with another aspect of the inventive concept, there is provided a mouse device that interacts with a computer or a TV that realizes an electronic device, the mouse device including a motion recognition module configured to recognize a motion of a user by using transmission and reception of an ultrasonic signal, and a battery configured to supply electric power to the motion recognition module.

The motion recognition module may include a plurality of micro-machined transducers disposed in a 2D array form to allow 3D beam condensation and configured to transmit and receive the ultrasonic signal.

An impedance matching unit having an impedance that is lower than those of the plurality of micro-machined transducers may be disposed at an upper end of the motion recognition module.

The motion recognition module may determine whether the ultrasonic signal reflected by a hand of the user and received is a preset reference value or higher, and may set the mouse device to any one of a general mouse mode or a motion recognition mode based on the determination result.

When the received ultrasonic signal is the preset reference value or lower, the motion recognition module may perform an operation of recognizing a motion of the user by setting the mouse device to the motion recognition mode.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

The above and other objects and features will become apparent from the following description with reference to the following figures, wherein like reference numerals refer to like parts throughout the various figures unless otherwise specified, and wherein.

DETAILED DESCRIPTION

Figure 1:
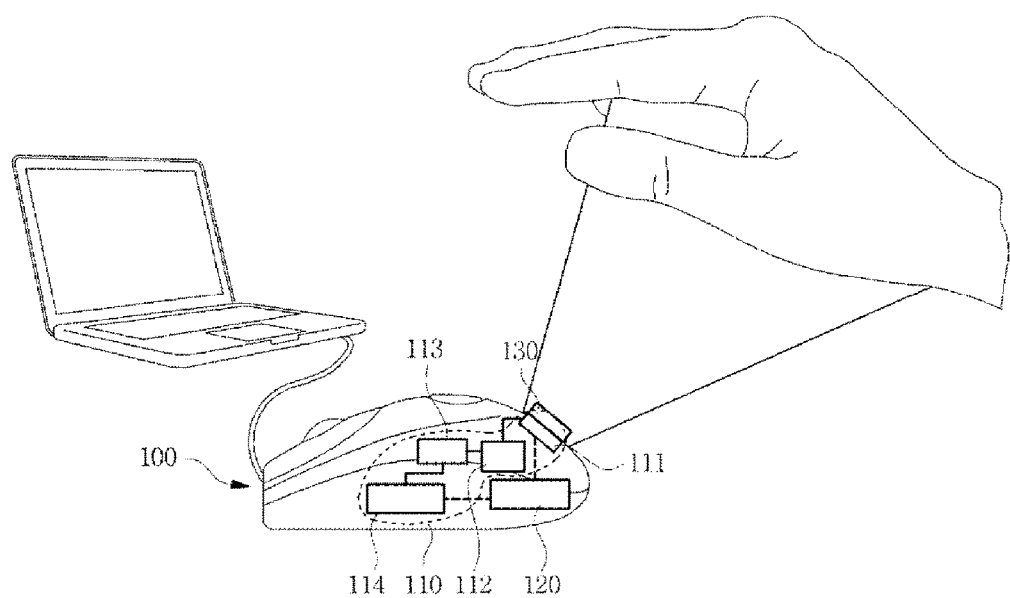
FIG. 1 is a view illustrating a user interface device according to an embodiment.

Hereinafter, embodiments of the inventive concept will be described in detail with reference to the accompanying drawings. However, the inventive concept is neither limited nor restricted by the embodiments. Further, the same reference numerals in the drawings denote the same members.

Furthermore, the terminologies used herein are used to properly express the embodiments of the inventive concept, and may be changed according to the intentions of the user or the manager or the custom in the field to which the inventive concept pertains. Therefore, definition of the terms should be made according to the overall disclosure set forth herein.

FIG. 1 is a view illustrating a user interface device according to an embodiment.

Referring to FIG. 1, a user interface device 100 according to an embodiment includes a motion recognition module 110 and a battery 120. Hereinafter, although it will be described that the user interface device 100 is a computer that realizes an electronic device or a mouse device that interacts with a TV, the inventive concept is not limited thereto but the user interface device 100 may be various user interface devices that receive a user input.

The motion recognition module 110 recognizes a motion (or pose) of the user by using transmission and reception of ultrasonic signals. In the following, a motion of the user (a motion of a hand of the user) may mean a gesture that including a locus, along which the pose of the user (the pose of the hand of the user) changes over time. Accordingly, the recognition of the motion of the user is based on recognition of the pose of the user.

In detail, the motion recognition module 110 may include a transmission/reception unit 111 configured transmit and receive ultrasonic signals, a pulser/receiver 112 configured to process ultrasonic signals, a beam former 113 configured to perform beam forming on ultrasonic signals, and an analog-digital converter (ADC) 114 configured to convert ultrasonic signals.

Accordingly, the motion recognition module 110 may transmit an ultrasonic signal generated by the pulser to a space in which a hand of the user is located, may process the ultrasonic signal reflected by the hand of the user and received by the transmission/reception unit 110, in the receiver 112, may convert the processed ultrasonic signal to a digital signal by the ADC 114, and may condense beams for channels by using the beam former 113, to recognize a motion of the user (a motion of a hand of the user) by computing the condensed beam.

For example, the motion recognition module 110 may generate a ultrasonic signal for transmission (a transmission pressure) by applying a digital pulse voltage to transmit the ultrasonic signal for transmission to the space in which the hand of the user is located, may convert an ultrasonic signal for reception (a reception pressure) reflected by the hand of the user and received to a reception voltage, and may condense beams for channels by converting the reception voltage to a digital signal, to recognize the motion of the hand of the user.

Then, although it has been described that the beam former 113 is a digital beam former, which is connected to a rear end of the ADC 114, the inventive concept is not limited thereto but the beam former 113 may be an analog beam former connected to a front end of the ADC 114. In this case, an ultrasonic signal reflected by the hand of the user and received by the transmission/reception unit 111 may be processed by the receiver 112, the beams for channels are condensed by using an analog beam former, and the ultrasonic signal may be converted to a digital signal by the ADC 114.

The motion recognizing operation may be performed by recognizing a locus along which a pose of the user, which is detected based on an ultrasonic signal repeatedly transmitted and received at a preset cycle, is moved.

Here, the pulser/receiver 114 and the ADC 114 may be a conventional pulser/receiver that generates and receives ultrasonic signals, respectively and a conventional ADC that converts an analog signal to a digital signal.

Then, although it has been described that the beam former 113 beam-forms an ultrasonic signal for reception, the inventive concept is not limited thereto but the beam former 113 may also beam-form an ultrasonic signal for transmission.

The transmission/reception unit 111 may include a micromachined transducer that transmits and receives an ultrasonic signal. Here, because a plurality of micro-machined transducers may be provided such that ultrasonic signals have a plurality of channels, 3D beam condensation (hereinafter, the 3D beam condensation means beam forming) for ultrasonic signals for reception may be allowed by transmitting ultrasonic signals for transmission while the plurality of micro-machined transducers have delays, respectively. Meanwhile, the plurality of micro-machined transducers may be disposed in a 2D array form, so that 3D beam condensation for ultrasonic signals for reception may be allowed. A detailed description thereof will be made with reference to FIG. 2.

Here, the motion recognition module 110 may be provided on one side of the user interface device 100, based on a location of the hand of the user who uses the user interface device 100. For example, the motion recognition module 110 may be provided at a rear end of the mouse device 100 at a specific angle such that the hand of the user who uses the mouse device 100 may transmit an ultrasonic signal.

Further, the motion recognition module 110 may be configured such that an angle or a location of the motion recognition module 110 may be adaptively adjusted so that an ultrasonic signal may be transmitted to a space in which the hand of the user is located.

Further, the user interface device 100 may further include an impedance matching unit 130. Then, the impedance matching unit 130 may be configured to have an impedance that is lower than that of the transmission/reception unit 111 (the plurality of micro-machined transducers) of the motion recognition module 110 so that an ultrasonic signal reflected by the hand of the user may be received better by the motion recognition module 110. For example, the impedance matching unit 130 may be formed of a (polydimethylsiloxane) stamp (PDMS) (a polymeric material) or a rubber material at an upper end of the motion recognition module 110, or may be formed of a hole at an upper end of the motion recognition module 110.

The user interface device 100 may be set to any one of a general user interface mode or a motion recognition mode to selectively perform a motion recognizing operation of the user. A detailed description thereof will be made with reference to FIGS. 3 to 4.

Accordingly, the battery 120 may be configured not only to supply electric power to the motion recognition module 110 but also to supply electric power to a component that performs a general user interface function of the user interface device 100.

As described above, the user interface device 100 according to the embodiment may include a motion recognition module 110 that uses an ultrasonic signal so that a technology of recognizing a motion of a user by using a very low power consumption of 0.002 W as compared with a power consumption of a general mouse device of 0.1 to 0.5 W may be applied (a power consumption of a conventional infrared ray sensor is 3 to 5 W).

Figure 2:
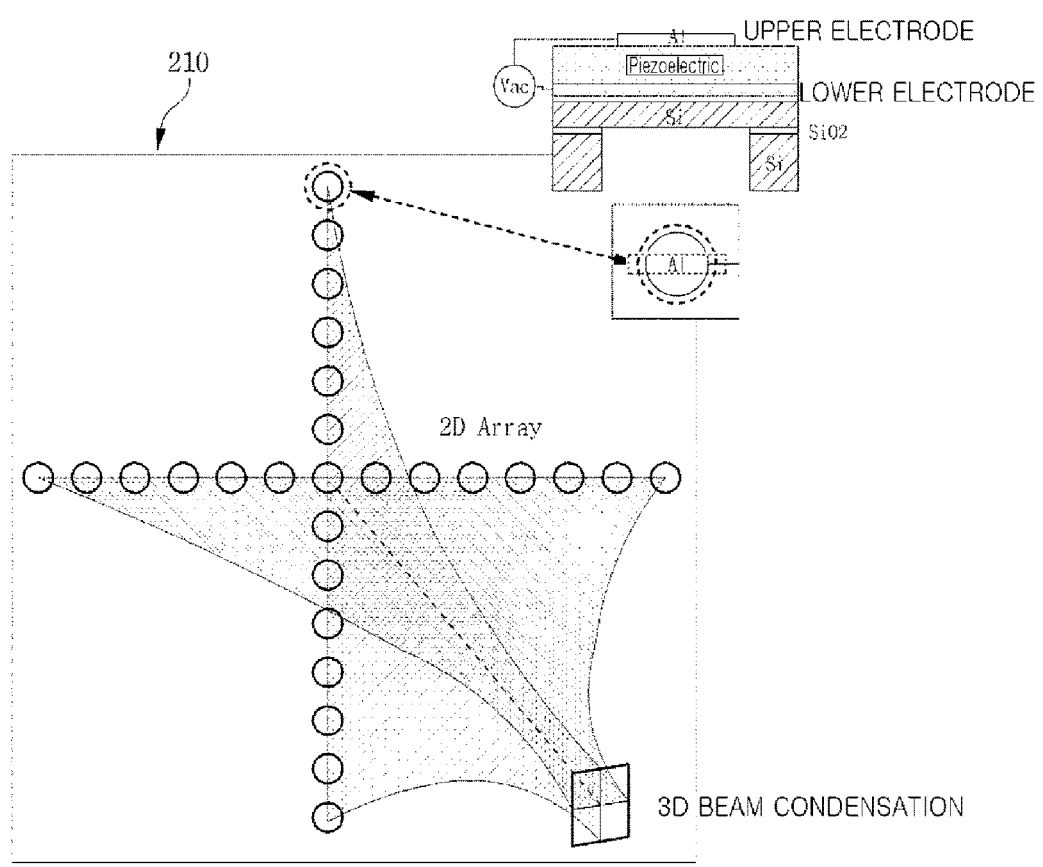
FIG. 2 is a view illustrating a motion recognition module according to an embodiment.

FIG. 2 is a view illustrating a motion recognition module according to an embodiment.

Referring to FIG. 2, the motion recognition module according to the embodiment may include a plurality of micro-machined transducers 210 that transmit and receive ultrasonic signals. Then, the plurality of micro-machined transducers 210 may be disposed in a 2D array form such that they allows 3D beam condensation of ultrasonic signals for reception to recognize a motion of the user by transmitting and receiving ultrasonic signals of a plurality of channels.

Here, the plurality of micro-machined transducers 210 may be piezoelectric micro-machined transducers of high sensitivity, which is realized by using sol-gel piezoelectric bodies.

Further, as illustrated in the drawings, each of the plurality of micro-machined transducers 210 may have a structure in which a sol-gel piezoelectric body (for example, sol-gel PZT) is disposed between an upper electrode (A1) and a lower electrode (A1) on a silicon substrate.

In this way, the plurality of micro-machined transducers 210 included in the motion recognition module according to the embodiment may be disposed in a 2D cross array form to control beam steering and condensation on a 3D.

Figure 3:
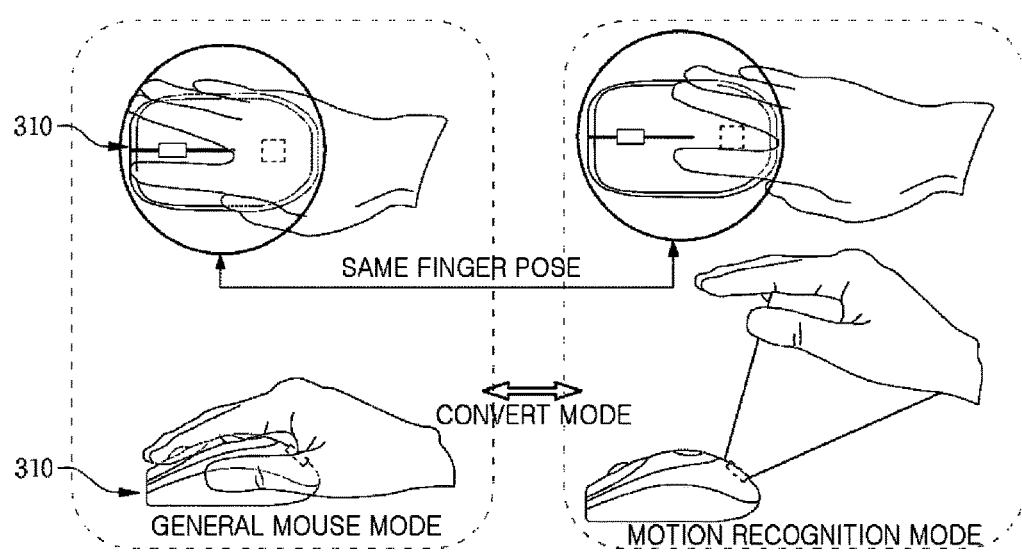
FIG. 3 is a view for explaining a general user interface mode or a motion recognition mode of a user interface device according to an embodiment.
Figure 4:
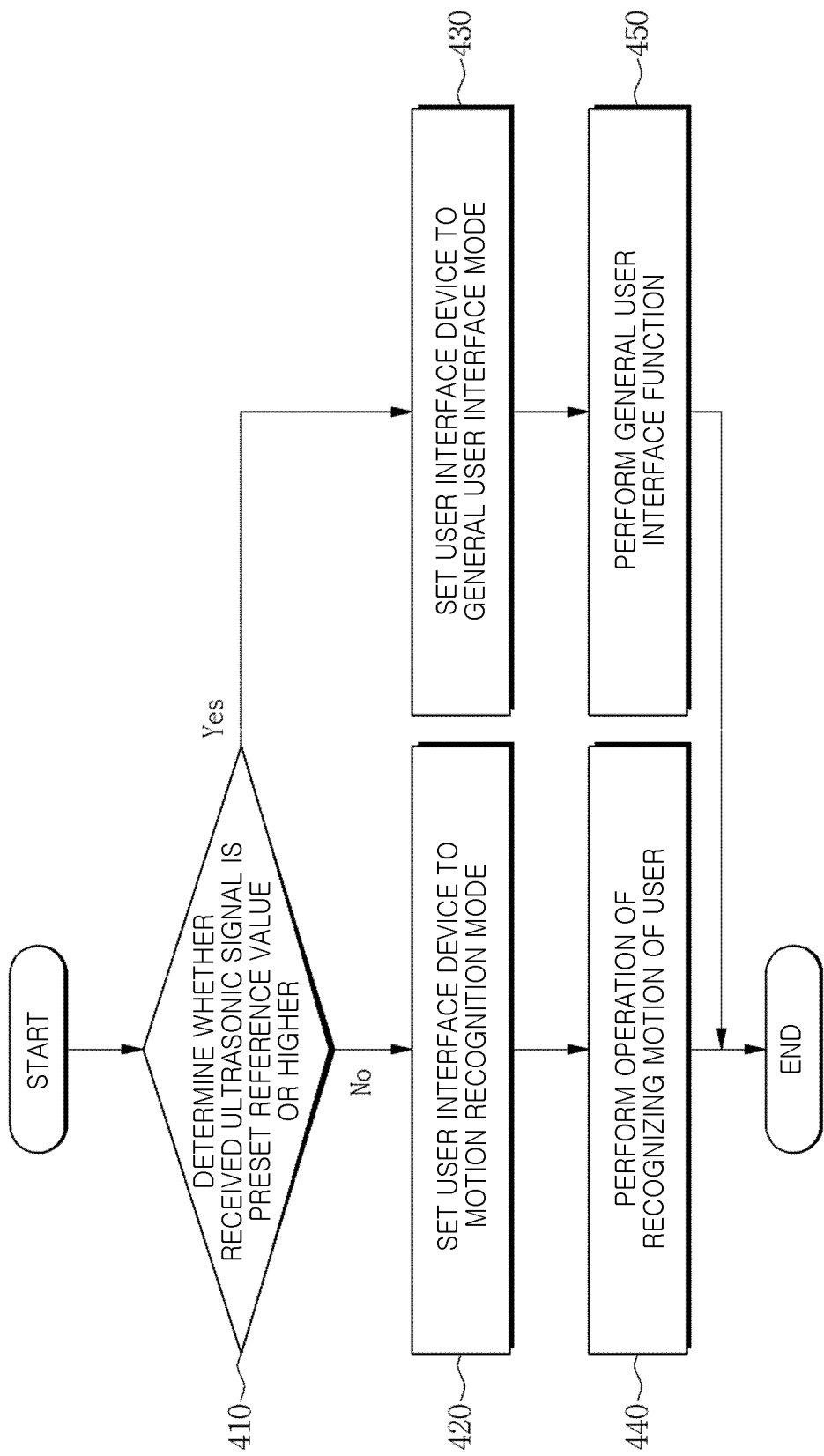
FIG. 4 is a flowchart illustrating an operation method of a user interface device according to an embodiment.

FIG. 3 is a view for explaining a general user interface mode or a motion recognition mode of a user interface device according to an embodiment. FIG. 4 is a flowchart illustrating an operation method of a user interface device according to an embodiment.

Referring to FIGS. 3 and 4, the motion recognition module included in the user interface device 310 according to the embodiment may selectively perform a motion recognizing operation of the user, by setting the user interface device 310 to any one of a general user interface mode or a motion recognition mode.

In detail, the motion recognition module may determine whether an ultrasonic signal reflected by a hand of the user and received is a preset reference value or higher (410), and may set a user interface device 310 to any one of a general user interface mode or a motion recognition mode based on the determination result (420 and 430). Accordingly, if the received ultrasonic signal is lower than the preset reference value and the user interface device 310 is set to a motion recognition mode (420), the motion recognition module may perform an operation of recognizing a motion of the user (440).

Meanwhile, if the received ultrasonic signal is the preset reference value or higher and the user interface device 310 is set to a general user interface mode (430), the motion recognition module may perform a general user interface function (450).

For example, in the case of (a) in which the hand of the user is attached to the mouse device 310, the ultrasonic signal reflected by the hand of the user and received is the preset reference value or higher. Accordingly, the motion recognition module may determine that the ultrasonic signal reflected by the hand of the user and received is the preset reference value or higher (410), may set the mouse device 310 to a general mouse mode (430), and may perform a general mouse function (450).

As another example, in the case of (b) in which the hand of the user is spaced apart from the mouse device 310 by a specific distance (for example, 5 cm) or more, the ultrasonic signal reflected by the hand of the user and received is the preset reference value or lower. Accordingly, the motion recognition module may determine that the ultrasonic signal reflected by the hand of the user and received is lower than the preset reference value (410), may set the mouse device 310 to a motion recognition mode (420), and may perform an operation of recognizing a motion of the user (440).

As illustrated in the drawings, the pose of the hand of the user has to be maintained both in the case of using a general mouse function of the mouse device 310 and in the case of using a motion recognition function. However, the inventive concept is not limited thereto, but the pose of the hand of the user may be freely moved within a range in which the motion recognition module included in the mouse device 310 recognizes a pose (or motion) of the hand of the user.

A detailed description of a process of transmitting an ultrasonic signal to the space in which the hand of the user is located and a process of processing and converting the received ultrasonic signal, condensing the beams for channels, and recognizing the motion of the user, before the process 410 of determining whether the ultrasonic signal reflected by the hand of the user and received is the preset reference value or higher has been made with reference to FIGS. 1 and 2, and thus will be omitted.

In this way, the user interface device 310 may collectively perform a general user interface function as well as an operation of recognizing a motion of the user, by selectively performing an operation of recognizing a motion of the user by the motion recognition module according to the mode.

Further, the user interface device 310 may minimize power consumed in the motion recognizing operation by selectively performing an operation of recognizing a motion of the user according to the mode.

Figure 5:
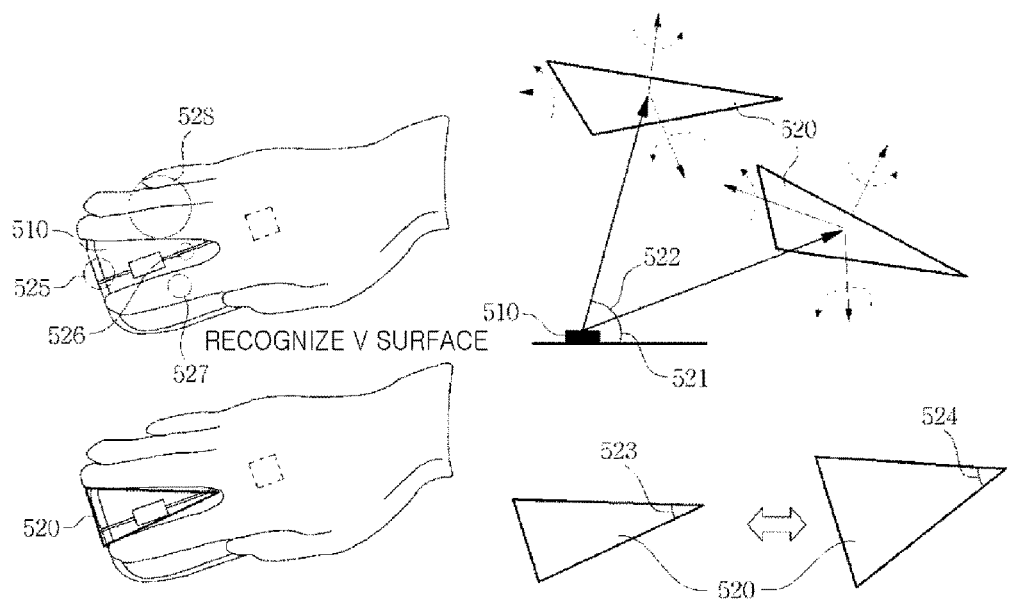
FIG. 5 is a view for explaining an operation of extracting a motion of a hand of a user and performing a user interface function corresponding to the motion of the hand of the user, in a user interface device according to an embodiment.

FIG. 5 is a view for explaining an operation of extracting a motion of a hand of a user and performing a user interface function corresponding to the motion of the hand of the user, in a user interface device according to an embodiment.

Referring to FIG. 5, the motion recognition module included in the user interface device 510 according to an embodiment may perform various user interface functions, based on the recognized motion (or pose) of the hand of the user as described above.

For example, the motion recognition module may call and execute a corresponding user interface function if a motion of the hand of the user is recognized, by constructing a table in which interface functions corresponding to motions (or poses) of the hand of the user are matched.

In particular, the motion recognition module may recognize a motion of the user, based on the basic shape of the hand of the user who uses the user interface device 510. For example, the motion recognition module may perform a user interface function by recognizing the shapes 520 (or motion) of the V surfaces of an index finger and a middle finger of the user, by using the fact that the basic shape of the hand of the user who uses the mouse device 510 has the shape 520 of the widened V surfaces of the index finger and the middle finger.

As a more detailed example, the motion recognition module performs a scroll function on a display, by recognizing a motion of the shape 520 of the V surface as an angle between the shape 520 of the V surface and the mouse device 510 is changed from a first angle 521 to a second angle 522.

As another example, the motion recognition module performs a zoom-in/zoom-out function on a display, by recognizing a motion of the shape 520 of the V surface as an angle formed by the index finger and the middle finger in the shape 520 of the V surface is changed from a first angle 523 to a second angle 524.

In this case, the motion recognition module may be improved such that the algorithm that is used to recognize a motion of the user is suitable for detection of the shape 520 of the V surface. For example, the algorithm used by the motion recognition module may be realized to detect the shape 520 of the V surface in consideration of a feature in which an upper side 525 of the shape 520 of the V surface is wider than lower side 526 thereof and a feature in which a left area 527 of the shape 520 of the V surface (a left area of the shape 520 of the V surface of the hand of the user) is narrow and a right area 528 of the shape of the V surface (a right area of the shape 520 of the V surface of the hand of the user) is wide.

Although it has been described that the user interface device is a mouse device, the inventive concept is not limited thereto but the user interface device 100 may be various user interface devices that receive a user input by interacting a computer or a TV that realizes an electronic device. For example, the user interface may be a keyboard. In this case, the motion recognition module may recognize a motion of the user, based on a basic shape of the hand in which all of ten fingers of the user who uses a keyboard are unfolded.

Figure 6:
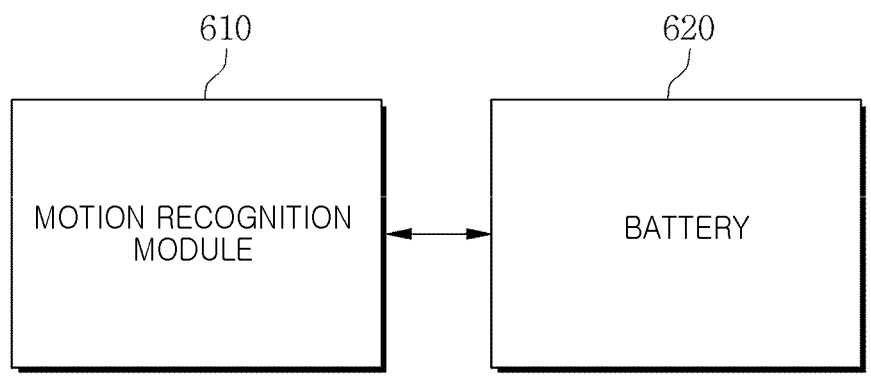
FIG. 6 is a block diagram illustrating a user interface device according to an embodiment.

FIG. 6 is a block diagram illustrating a user interface device according to an embodiment.

Referring to FIG. 6, a user interface device 100 according to an embodiment includes a motion recognition module 610 and a battery 620.

The motion recognition module 610 recognizes a motion of the user by using transmission and reception of ultrasonic signals.

In detail, the motion recognition module 610 may transmit an ultrasonic signal to a space in which a hand of the user is located, and may extract a motion of the hand of the user based on the ultrasonic signal reflected by the hand of the user and received. Accordingly, the motion recognition module 610 may perform a user interface function corresponding to the extracted motion of the hand of the user.

Then, the motion recognition module 610 may include a plurality of micro-machined transducers that are disposed in a 2D array form to allow 3D beam condensation to transmit and receive ultrasonic signals. Here, the plurality of micro-machined transducers may be piezoelectric micro-machined transducers of high sensitivity, which is realized by using sol-gel piezoelectric.

Further, the motion recognition module 610 may include a pulser/receiver configured to process an ultrasonic signal; a beam former configured to perform beam forming on an ultrasonic signal; and an analog-digital converter (ADC) configured to convert an ultrasonic signal.

An impedance matching unit having impedance that is lower than those of the plurality of micro-machined transducers may be disposed at an upper end of the motion recognition module 610. Then, the impedance matching unit may be formed of a (polydimethylsiloxane) stamp (PDMS) or a rubber material at an upper end of the motion recognition module 610, or may be formed of a hole at an upper end of the motion recognition module 610.

In detail, the motion recognition module 610 may determine whether an ultrasonic signal reflected by a hand of the user and received is a preset reference value or higher, and may set a user interface device to any one of a general user interface mode or a motion recognition mode based on the determination result.

For example, the motion recognition module 610 may perform an operation of recognizing a motion of the user by setting the user interface device to a motion recognition mode when the ultrasonic signal received is a preset reference value or lower.

Here, the motion recognition module 610 may be provided on one side of the user interface device, based on a location of the hand of the user who uses the user interface device.

Further, the motion recognition module 610 may be configured such that an angle or a location of the motion recognition module may be adaptively adjusted so that an ultrasonic signal may be transmitted to a space in which the hand of the user is located.

The battery 620 supplies electric power to the motion recognition module 610.

Embodiments of the inventive concept may provide a user interface device that recognizes a motion of a user, the user interface device improving power consumption.

In detail, embodiments of the inventive concept may provide a user interface device that recognizes a motion of a user by using transmission and reception of ultrasonic signals.

Embodiments of the inventive concept also may provide a user interface device, a mode of which is set to any one of a general user interface mode or a motion recognition mode to selectively perform an operation of recognizing a motion of a user.

Although the embodiments of the present disclosure have been described with reference to the limited embodiments and the drawings, the inventive concept may be variously corrected and modified from the above description by those skilled in the art to which the inventive concept pertains. For example, the above-described technologies can achieve a suitable result even though they are performed in different sequences from those of the above-mentioned method and/ or coupled or combined in different forms from the method in which the constituent elements such as the system, the architecture, the device, or the circuit are described, or replaced or substituted by other constituent elements or equivalents.

Therefore, the other implementations, other embodiments, and the equivalents of the claims pertain to the scope of the claims.

While illustrative embodiments have been illustrated and described, it will be appreciated that various changes can be made therein without departing from the spirit and scope of the invention.

The embodiments of the invention in which an exclusive property or privilege is claimed are defined as follows:

1. A user interface device that interacts with a computer or a TV that realizes an electronic device, the user interface device comprising:
   a motion recognition module configured to recognize a motion of a user by using transmission and reception of an ultrasonic signal; and
   a battery configured to supply electric power to the motion recognition module,
   wherein the motion recognition module determines whether the ultrasonic signal reflected by a hand of the user and received is a preset reference value or higher, and sets the user interface device to any one of a general user interface mode or a motion recognition mode based on the determination result,
   wherein the motion recognition module transmits the ultrasonic signal to a space in which a hand of the user is located, and extracts a motion of the hand of the user based on the ultrasonic signal reflected by the hand of the user and received, and
   wherein the motion recognition module extracts the motion of the hand of the user, based on a shape of a widened V surface, of the shape of the hand of the user who uses the user interface device, between an index finger and a middle finger.

2. The user interface device of claim 1, wherein the motion recognition module includes:
   a plurality of micro-machined transducers disposed in a 2D array form to allow 3D beam condensation and configured to transmit and receive the ultrasonic signal.

3. The user interface device of claim 2, wherein the plurality of micro-machined transducers are piezoelectric micro-machined transducers of high sensitivity, which are realized by using sol-gel piezoelectric bodies.

4. The user interface device of claim 2, wherein an impedance matching unit having an impedance that is lower than those of the plurality of micro-machined transducers is disposed at an upper end of the motion recognition module.

5. The user interface device of claim 4, wherein the impedance matching unit is formed of a PDMS or a rubber material at an upper end of the motion recognition module or is formed of a hole at an upper end of the motion recognition module.

6. The user interface device of claim 1, wherein when the received ultrasonic signal is at the preset reference value or lower, the motion recognition module performs an operation of recognizing a motion of the user by setting the user interface device to the motion recognition mode.

7. The user interface device of claim 1, wherein the motion recognition module performs a user interface function corresponding to the extracted motion of the hand of the user.

8. The user interface device of claim 1, wherein the motion recognition module is provided on one side of the user interface device, based on a location of the hand of the user who uses the user interface device.

9. The user interface device of claim 2, wherein the motion recognition module includes:
   a pulser/receiver configured to process the ultrasonic signal;
   a beam former configured to perform beam forming on the ultrasonic signal; and
   an analog-digital converter configured to convert the ultrasonic signal.

10. A mouse device that interacts with a computer or a TV that realizes an electronic device, the mouse device comprising:
    a motion recognition module configured to recognize a motion of a user by using transmission and reception of an ultrasonic signal; and
    a battery configured to supply electric power to the motion recognition module,
    wherein the motion recognition module is configured to:
        determine whether the ultrasonic signal reflected by a hand of the user and received is a preset reference value or higher, and sets the mouse device to any one of a general mouse mode or a motion recognition mode based on the determination result,
        transmit the ultrasonic signal to a space in which a hand of the user is located, and
        extract a motion of the hand of the user based on the ultrasonic signal reflected by the hand of the user and received, and
    wherein the motion recognition module extracts the motion of the hand of the user, based on a shape of a widened V surface, of the shape of the hand of the user who uses the user interface device, between an index finger and a middle finger.

11. The mouse device of claim 10, wherein the motion recognition module includes:
    a plurality of micro-machined transducers disposed in a 2D array form to allow 3D beam condensation and configured to transmit and receive the ultrasonic signal.

12. The mouse device of claim 10, wherein an impedance matching unit has an impedance that is lower than those of the plurality of micro-machined transducers is disposed at an upper end of the motion recognition module.

13. The mouse device of claim 10, wherein when the received ultrasonic signal is at the preset reference value or lower, the motion recognition module performs an operation of recognizing a motion of the user by setting the mouse device to the motion recognition mode.

* * * * *